US008506446B2

(12) United States Patent
Minadeo et al.

(10) Patent No.: US 8,506,446 B2
(45) Date of Patent: Aug. 13, 2013

(54) PIN FOR PLANETARY GEAR SYSTEM

(75) Inventors: Adam Daniel Minadeo, Greenville, SC (US); Daniel Jason Erno, Clifton Park, NY (US); Priyangu Chunilal Patel, Simpsonville, SC (US); Fulton Jose Lopez, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 126 days.

(21) Appl. No.: 13/210,716

(22) Filed: Aug. 16, 2011

(65) Prior Publication Data
US 2012/0053009 A1 Mar. 1, 2012

(51) Int. Cl.
*F16H 57/08* (2006.01)
(52) U.S. Cl.
USPC ........................................................ 475/346
(58) Field of Classification Search
None
See application file for complete search history.

(56) References Cited

U.S. PATENT DOCUMENTS

| 3,303,713 | A | * | 2/1967 | Hicks | 74/411 |
|---|---|---|---|---|---|
| 3,943,787 | A | * | 3/1976 | Hicks | 74/410 |
| 3,964,334 | A | * | 6/1976 | Hicks | 475/347 |
| 3,983,764 | A | * | 10/1976 | Hicks | 74/410 |
| 4,090,416 | A | * | 5/1978 | Hicks | 475/5 |
| 5,098,359 | A | | 3/1992 | Chales et al. | |
| 5,102,379 | A | * | 4/1992 | Pagluica et al. | 475/331 |
| 5,558,593 | A | | 9/1996 | Röder et al. | |
| 5,679,089 | A | | 10/1997 | Levedahl | |
| 5,700,218 | A | | 12/1997 | VanSelous et al. | |
| 5,871,415 | A | * | 2/1999 | Fuhrer et al. | 475/346 |
| 5,928,100 | A | * | 7/1999 | Ohtake et al. | 475/159 |
| 6,368,221 | B1 | | 4/2002 | Sudau | |
| 6,481,553 | B1 | * | 11/2002 | Lee | 192/70.2 |
| 6,770,007 | B2 | | 8/2004 | Fox | |
| 6,994,651 | B2 | | 2/2006 | Fox et al. | |
| 7,056,259 | B2 | * | 6/2006 | Fox | 475/348 |
| 7,297,086 | B2 | | 11/2007 | Fox | |
| 7,537,537 | B2 | | 5/2009 | Smet et al. | |
| 7,662,059 | B2 | * | 2/2010 | McCune | 475/159 |
| 7,883,438 | B2 | * | 2/2011 | McCune | 475/159 |
| 8,298,114 | B2 | * | 10/2012 | Lopez et al. | 475/347 |

(Continued)

FOREIGN PATENT DOCUMENTS

JP  2010-156415 A  7/2010

OTHER PUBLICATIONS

Search Report issued in connection with EP Application No. 12180386.0, Oct. 29, 2012.

*Primary Examiner* — Dirk Wright
(74) *Attorney, Agent, or Firm* — Dority & Manning, PA

(57) ABSTRACT

A planetary gear system and a pin for coupling a planet gear to a carrier in a planetary gear system are disclosed. The planetary gear system includes a planet gear defining a central planet axis, a carrier disposed adjacent the at least one planet gear, and a pin extending from the carrier through the planet gear generally along the central planet axis. The pin includes a first end, a second end, and an outer surface extending therebetween. The pin further defines an opening extending from the outer surface generally along the central planet axis and at least partially through the pin.

20 Claims, 5 Drawing Sheets

(56) References Cited

U.S. PATENT DOCUMENTS

| | | |
|---|---|---|
| 2003/0073537 A1 | 4/2003 | Lloyd |
| 2008/0194378 A1 | 8/2008 | Fox |
| 2008/0269007 A1 | 10/2008 | Cunliffe et al. |
| 2009/0163316 A1 | 6/2009 | Saenz De Ugarte et al. |
| 2009/0170655 A1 | 7/2009 | Seanz De Ugarte et al. |
| 2009/0270216 A1* | 10/2009 | Poon et al. ............. 475/178 |
| 2010/0197445 A1 | 8/2010 | Montestruc |
| 2010/0303626 A1 | 12/2010 | Mostafi |
| 2010/0331140 A1 | 12/2010 | McCune |
| 2011/0053730 A1 | 3/2011 | Fox et al. |
| 2012/0277056 A1* | 11/2012 | Erno et al. ............. 475/331 |

\* cited by examiner

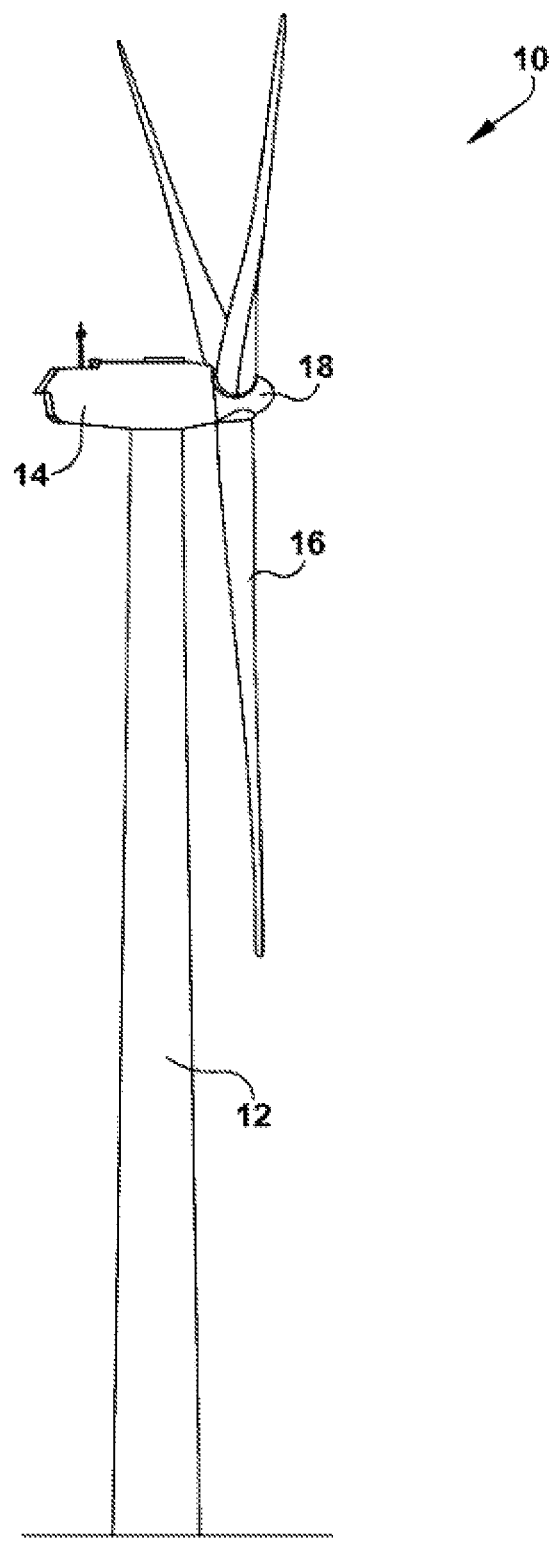
FIG. -1-

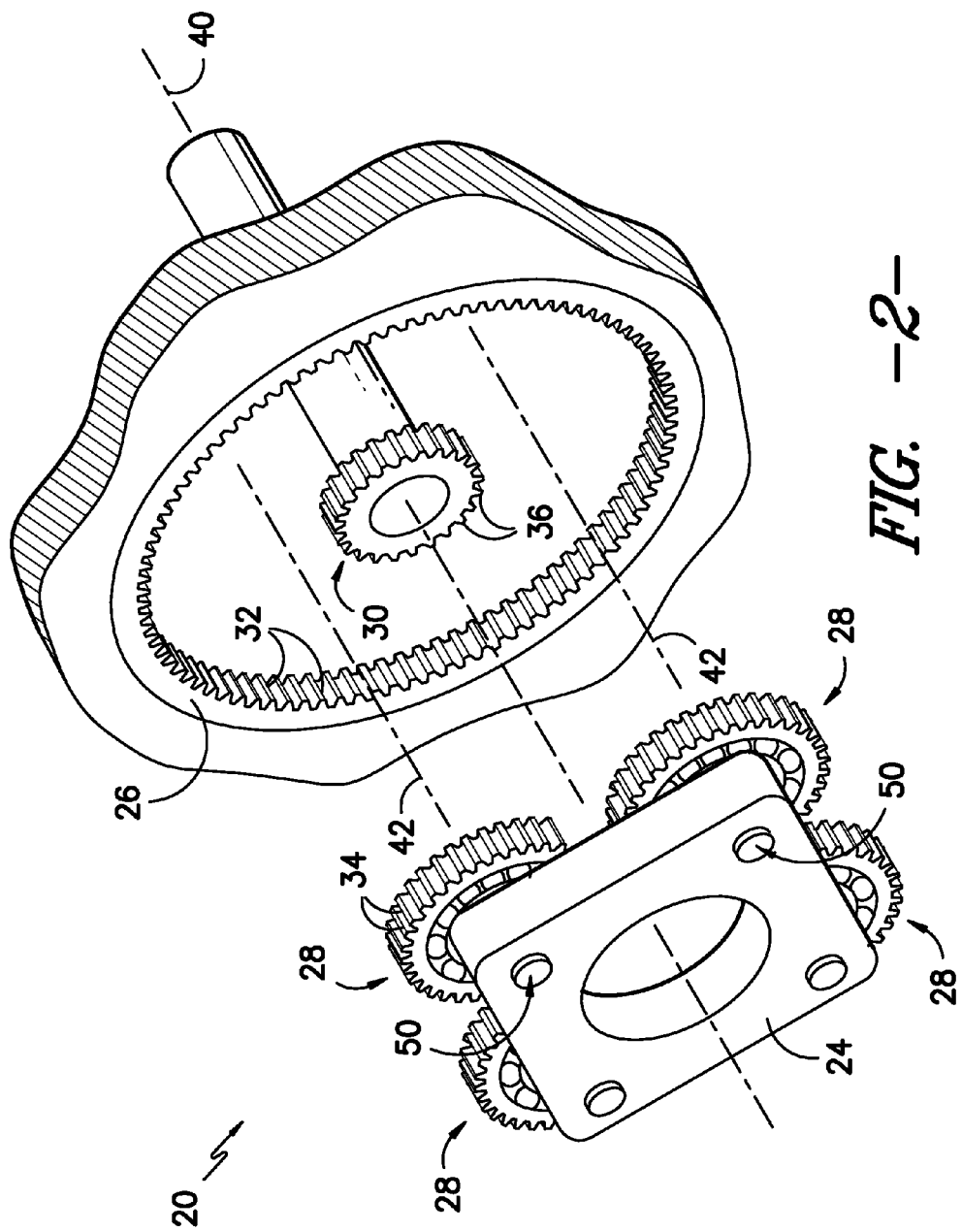
FIG. -2-

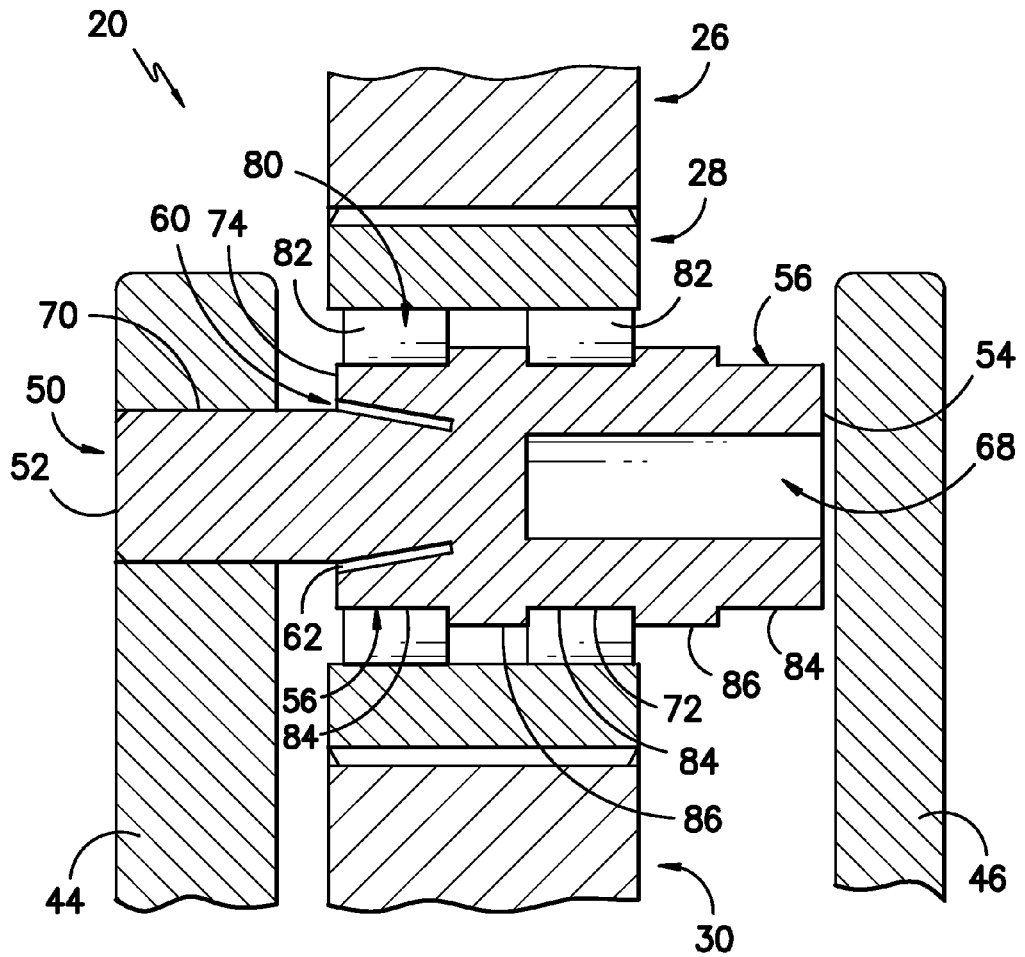
FIG. -3-

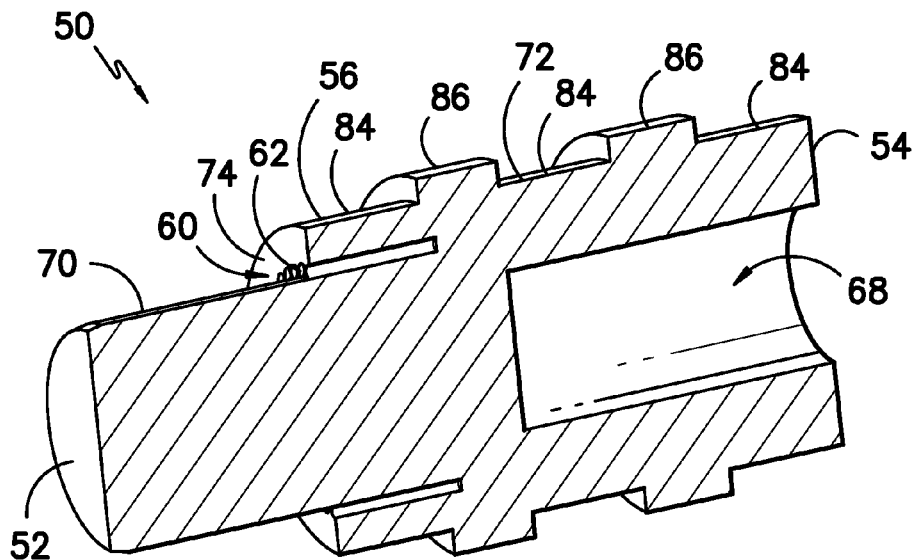
FIG. -4-
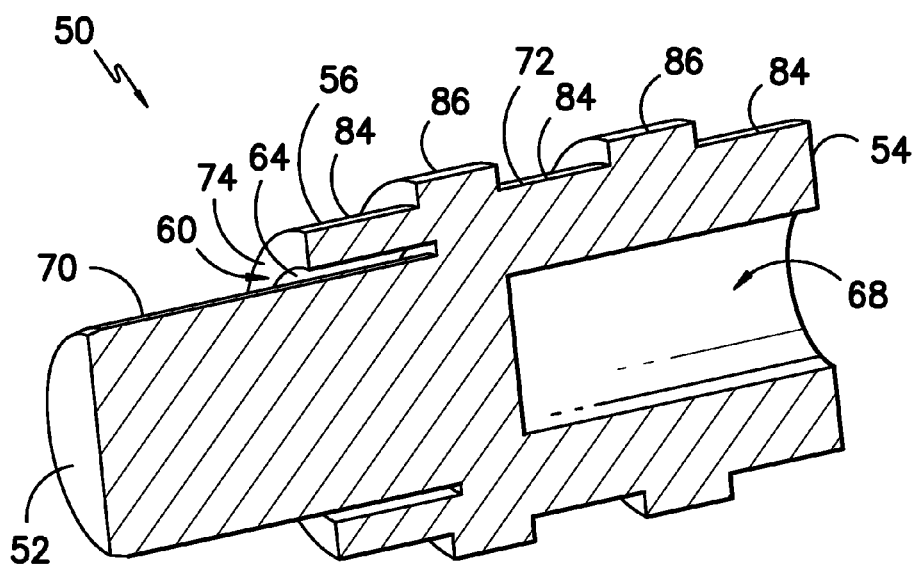
FIG. -5-

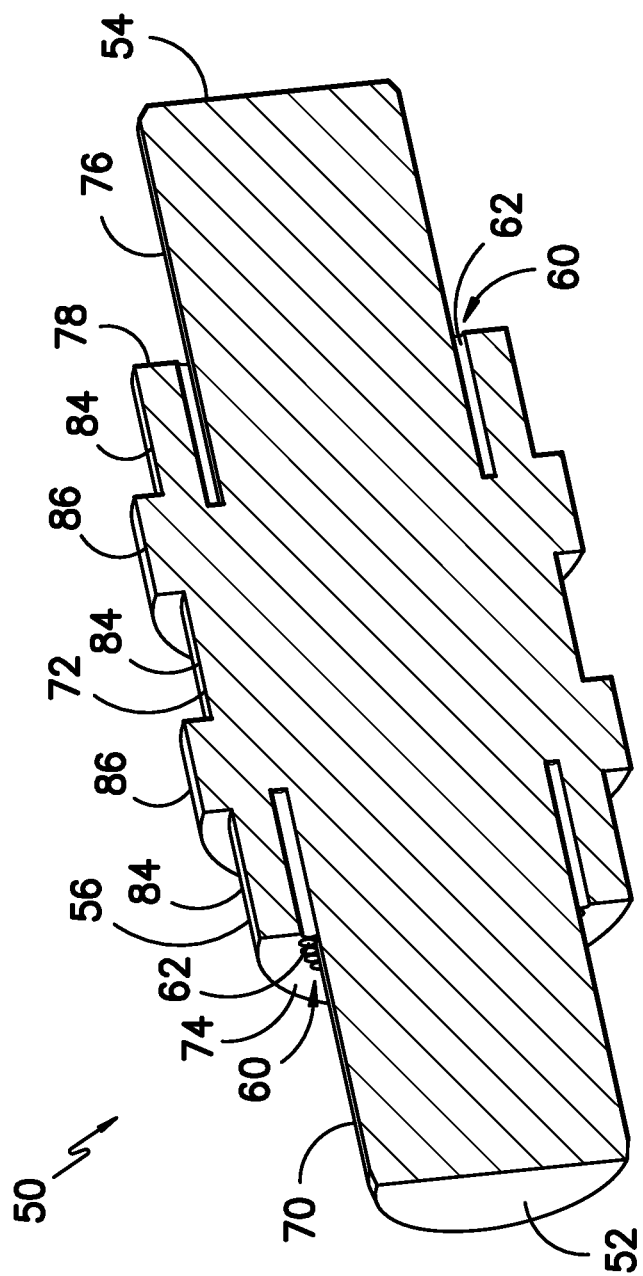
FIG. -6-

PIN FOR PLANETARY GEAR SYSTEM

FIELD OF THE INVENTION

The present disclosure relates in general to planetary gear systems, and more particularly to compliant pins that couple planet gears to carriers in planetary gear systems.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gear system, or if a gear system is not used, directly to the generator. The generator then converts the mechanical energy to electrical energy that may be deployed to a utility grid.

Proper alignment of the meshing teeth of adjacent gears in a gear system, and in particular a planetary gear system, is important for the proper distribution of loads. However, in many current gear systems, various design and operational factors prevent proper alignment of the meshing teeth. For example, manufacturing and design tolerances for the various gears, which typically have involute gear profiles with involute gear teeth, can cause misalignment between the meshing teeth of the adjacent gears. Further, and in particular for gear systems in wind turbines, various components of the gear system such as the carrier experience twisting and/or bending during operation. This twisting and bending is typically caused by loading of an input shaft of the gear system and twisting and bending thereof. Twisting and bending can cause additional misalignment between the meshing teeth of the adjacent gears in the gear system.

Misalignments between adjacent gears in a gear system can have potentially catastrophic results for the gear system and, in wind turbine settings, for the wind turbine itself. For example, misalignments can cause the loads experienced by various gears in the gear system to increase by two or more times the designed loading limits. Thus, the gears that experience this increased loading can become damaged or fail during operation of the gear system, potentially resulting in failure of the gear system.

Thus, an improved gear system, such as an improved planetary gear system, would be desired in the art. For example, a gear system with improved load distribution features would be advantageous.

BRIEF DESCRIPTION OF THE INVENTION

Aspects and advantages of the invention will be set forth in part in the following description, or may be obvious from the description, or may be learned through practice of the invention.

In one embodiment, a planetary gear system is disclosed. The planetary gear system includes, a planet gear defining a central planet axis, a carrier disposed adjacent the at least one planet gear, and a pin extending from the carrier through the planet gear generally along the central planet axis. The pin includes a first end, a second end, and an outer surface extending therebetween. The pin further defines an opening extending from the outer surface generally along the central planet axis and at least partially through the pin.

In another embodiment, a pin for coupling a planet gear to a carrier in a planetary gear system is disclosed. The pin includes a first end, a second end, an outer surface extending between the first end and the second end, and an opening defined in the pin extending from the outer surface generally along a central planet axis and at least partially through the pin.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 is an exploded perspective view of a planetary gear system according to one embodiment of the present disclosure;

FIG. 3 is a cross-sectional view of a planetary gear system according to one embodiment of the present disclosure;

FIG. 4 is a perspective cross-sectional view of a pin according to one embodiment of the present disclosure;

FIG. 5 is a perspective cross-sectional view of a pin according to another embodiment of the present disclosure; and, FIG. 6 is a perspective cross-sectional view of a pin according to another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft, as discussed below. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 illustrates one embodiment of a planetary gear system 20 according to the present disclosure. An input shaft (not shown) may provide an input load to the system 20. In embodiments wherein the system 20 is included in a wind turbine 10, the system 20 may provide an output load to a generator (not shown), as is generally known in the art. Thus, during operation, input load at an input rotational speed is transmitted through the planetary gear system 20 and provided as output load at output rotational speed to the generator.

During operation, the input shaft may be subjected to a variety of loads. For example, the input shaft may experience bending loads during operation. The planetary gear system 20 of the present disclosure, as discussed below, advantageously includes improved load distribution features. These load distribution features may reduce or prevent the various components of the planetary gear system from experiencing increased loading due to misalignment caused by transmission of the bending loads or other loads thereto. Additionally, these load distribution features may reduce or prevent the various components of the planetary gear system from experiencing increased loading due to misalignment caused by manufacturing and design tolerances. By reducing or preventing such increased loading of the various components of the system 20, such as the various gears, the improved load distribution features may increase the life of the system 20 and, in some embodiments, a wind turbine 10 in which the system 20 is incorporated.

In exemplary embodiments, the planetary gear system 20 is a single stage planetary gear system 20. Thus, the input rotational speed may be converted to the output rotational speed through a single stage of various mating gears, as discussed below. Alternatively, however, the planetary gear system 20 may be a multiple stage planetary gear system 20, and the input rotational speed may be converted to the output rotational speed through multiple stages of various mating gears.

The planetary gear system 20 includes a carrier 24 and a plurality of gears. For example, the planetary gear system 20 in exemplary embodiments as shown includes a ring gear 26, one or more planet gears 28, and a sun gear 30. The system 20 may include one, two, three, four, five, six, seven, eight, or more planet gears 28. Each of the gears 26, 28, 30 includes a plurality of teeth. For example, the ring gear 26 includes teeth 32, each planet gear 28 includes teeth 34, and each sun gear 30 includes teeth 36. The teeth 32, 34, and 36 are sized and shaped to mesh together such that the various gears 26, 28, 30 engage each other. For example, the ring gear 26 and the sun gear 30 may each engage the planet gears 28.

In some embodiments, the carrier 24 may be stationary. In these embodiments, the input shaft may be coupled to the ring gear 26, and input loads on the input shaft may be transmitted through the ring gear 26 to the planet gears 28. Thus, the ring gear 26 may drive the system 20. In other embodiments, the ring gear 26 may be stationary. In these embodiments, the input shaft may be coupled to the carrier 24, and input loads on the input shaft may be transmitted through the carrier 24 to the planet gears 28. Thus, the carrier 24 may drive the system 20. In still further embodiments, any other suitable component, such as a planet gear 28 or sun gear 30, may drive the system 20.

The sun gear 30 in exemplary embodiments defines a central axis 40, and thus rotates about this central axis 40. The ring gear 26 may at least partially surround the sun gear 30, and be positioned along the central axis 40. For example, the ring gear 26 may be aligned with the sun gear 30 along the central axis 40, or may be offset from the sun gear 30 along the axis 40. The ring gear 26 may (if rotatable) thus rotate about the central axis 40.

Each of the planet gears 28 may be disposed between the sun gear 30 and the ring gear 26, and may engage both the sun gear 30 and the ring gear 26. For example, the teeth 32, 34, and 36 may mesh together, as discussed above. Further, each of the planet gears 28 may define a central planet axis 42, as shown. Thus, each planet gear 28 may rotate about its central planet axis 42. Additionally, the planet gears 28 and central planet axes 42 thereof may rotate about the central axis 40.

The carrier 24 may be disposed adjacent the planet gears 28, and may further be positioned along the central axis 40. The carrier 24 may include a first carrier plate 44 and, in some embodiments, a second carrier plate 46 (see FIG. 3). In embodiments wherein the carrier 24 includes both a first carrier plate 44 and a second carrier plate 46, the planet gears 28 may be disposed therebetween.

Each planet gear 28 according to the present disclosure may be coupled to the carrier 24. For example, a pin 50 may extend through at least a portion of the carrier 24 and planet gear 28 to couple the planet gear 28 and carrier 24 together. The pin 50 may extend and be positioned along the central planet axis 42, such that the planet gear 28 may rotate about the pin 50.

As shown in FIGS. 3 through 6, a pin 50 may include a first end 52, a second end 54, and an outer surface 56 extending therebetween. The pin 50 may further define at least one opening 60. The opening 60 may extend from the outer surface 56 at least partially through the pin 50 generally along the central planet axis 42. Openings 60 defined in the pin 50 may advantageously provide improved load distribution features to the planetary gear system 20. For example, an opening 60 according to the present disclosure allows a pin 50 to be compliant during operation of the system 20. Such compliance may allow the various gears of the system 20 to maintain proper alignment with one another during operation despite manufacturing and design tolerances of the various gears and despite loading of the system 20.

Thus, pins 50 according to the present disclosure may reduce or prevent the various components, such as planet gears 28, of the planetary gear system 20 from experiencing increased loading due to misalignment caused by transmission of the bending loads or other loads thereto. Additionally, pins 50 may reduce or prevent the various components, such as planet gears 28 of the planetary gear system 20 from experiencing increased loading due to misalignment caused by manufacturing and design tolerances. For example, the compliance of the pins 50 as discussed herein allows the pins to flex as required, due to loading, which allows the central planet axes 42 to remain generally parallel during operation despite such loading. Further, pins 50 may allow for safety factors against misalignment and/or increased loading to be reduced, thus decreasing the mass as well as the production costs of the various components, such as the planet gears 28, of the planetary gear system 20.

In some embodiments, as shown in FIGS. 3, 4, and 6, an opening 60 may be a bore hole 62. Thus, one or more bore holes 62 may be defined in the pin 50. The bore holes 62 may be defined in an annular array about the central planet axis 42. It should be understood that any suitable number of bore holes 62 with any suitable spacing therebetween are within the scope and spirit of the present disclosure. In other embodiments, an opening 60 may be a generally annular opening 64, as shown in FIG. 5, or semi-annular opening. The annular opening 64 or semi-annular opening may be defined along the central planet axis 42.

The stiffness, and thus the compliance, of a pin 50 according to the present disclosure may be controlled by including more or less, longer or shorter, and larger or narrower openings 60. For example, more openings, longer openings, and/or larger openings may reduce the stiffness and increase the compliance, while less openings, shorter openings, and/or narrower openings may increase the stiffness and reduce the compliance.

Further, in some embodiments, as shown in FIGS. 4 through 6, an opening 60 according to the present disclosure may extend parallel to the central planet axis 42. In other embodiments, an opening 60 may extend inwardly towards the central planet axis 42, as shown in FIG. 3, or outwardly away from the central planet axis 42.

In exemplary embodiments, a pin 50 according to the present disclosure may be fixedly mounted to the carrier 24. For example, the pin 50 may be press-fit into the carrier 24, or may be secured with an adhesive or mechanical fastener, or may be otherwise fixedly mounted thereto. Alternatively, however, a pin 50 may be movably mounted to the carrier 24, such that the pin 50 is rotatable with respect to the carrier 24.

In some embodiments, the pin 50 further defines one or more central passages 68. A central passage 68 may extend at least partially through the pin 50, and may extend along the central planet axis 42. In some embodiments, a central passage 68 may extend from the second end 54 towards the first end 52, as shown in FIGS. 3 through 5, while in other embodiments, a central passage 68 may extend from the first end 52 towards the second end 54. The central passage 68 reduces the amount of material necessary to form the pin 50, and may further increase the compliance of the pin 50.

In some embodiments, as shown in FIG. 3, only one of the first end 52 or the second end 54 is supported. For example, FIG. 3 illustrates the first end 52 being supported by the first carrier plate 44 and the second end 54 unsupported by the second carrier plate 46. Alternatively, the first end 52 may be unsupported and the second end 54 supported. Support of only one end of the pin 50 such that the pin 50 is a cantilevered pin 50 may further increase the compliance of the pin 50. In alternative embodiments, both the first end 52 and second end 54 may be supported, such as by first carrier plate 44 and second carrier plate 46.

In some embodiments, the outer surface 56 is a generally continuous surface extending from the first end 52 to the second end 54. In other embodiments, however, the outer surface 56 includes various non-continuous portions between the first end 52 and the second end 54. For example, as shown in FIGS. 3 through 6, in some embodiments the outer surface 56 includes a first portion 70 extending from the first end 52 and a second portion 72 extending between the first portion 70 and the second end 54. The second portion 72 may have a diameter that is larger than a diameter of the first portion 70, as shown, or may have a smaller diameter. Further, in these embodiments, the outer surface 56 may further include an annular wall 74 between the first portion 70 and second portion 72.

The second portion 72 may, as shown in FIGS. 3 through 5, extend to the second end 54. Alternatively, as shown in FIG. 6, however, the outer surface 56 may further include a third portion 76 extending between the second portion 72 and the second end 54, and an annular wall 78 between the second portion 72 and third portion 78. The third portion 76 may have a diameter that is smaller than a diameter of the second portion 72, as shown, or may have a larger diameter. Further the third portion 76 may have a diameter that is generally equally to the diameter of the first portion 70, or larger or smaller than the first portion 70.

An opening 60 in the pin 50 may in some embodiments, as shown in FIGS. 3 through 6, extend from a wall 74 or 78 generally along the central planet axis 42 and at least partially through the pin 50. Alternatively, an opening 60 may extend from first portion 70, second portion 72, or third portion 76, or from any location along the generally continuous outer surface 56.

A pin 50 according to the present disclosure may be formed from any suitable material or materials. For example, the pin 50 may be formed from metals or metal alloys such as steel alloys, or plastics or other suitable materials. The materials may further be heat treated or otherwise treated or modified as desired or required.

As discussed, a pin 50 according to the present disclosure extends at least partially through a planet gear 28 and couples the planet gear 28 to carrier 24. The planet gear 28 may in exemplary embodiments be rotatable about the 50 that extends therethrough. For example, in some embodiments, a bearing 80 may be disposed between a pin 50 and a planet gear 28. The bearing 80 may include a plurality of rolling elements 82. The rolling elements 82 may be arranged in one or more generally annular arrays about the pin 50.

An inner race 84 may be positioned between the pin 50 and bearing 80. The inner race 84 may include an outer surface that contacts the bearing 80. In some embodiments, the inner race 84 may be a separate component from the pin 50. In other embodiments as shown in FIGS. 3 through 6, however, the inner race 84 may be defined by the outer surface 56, such that the outer surface of the inner race 84 is the outer surface 56 of the pin 50. This may eliminate the need for a separate inner race component.

Additionally, in some embodiments, the inner race 84 may include one or more ridges 86. The ridges 86 may be provided to space apart the various annular arrays of rolling elements 82 in the bearing 80.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A planetary gear system comprising:
a planet gear defining a central planet axis;
a carrier disposed adjacent the at least one planet gear; and,
a pin extending from the carrier through the planet gear generally along the central planet axis, the pin comprising a first end, a second end, and an outer surface extending therebetween, the pin further defining plurality of bore holes positioned in an annular array about the central planet axis, each of the plurality of bore holes extending from the outer surface generally along the central planet axis and at least partially through the pin.

2. The planetary gear system of claim 1, wherein each of the plurality of bore holes extends parallel to the central planet axis.

3. The planetary gear system of claim 1, wherein each of the plurality of bore holes extends inwardly towards the central planet axis.

4. The planetary gear system of claim 1, wherein the first end is fixedly mounted to the carrier.

5. The planetary gear system of claim 1, further comprising a bearing, the bearing comprising a plurality of rolling elements.

6. The planetary gear system of claim 5, wherein the outer surface defines an inner race in contact with the plurality of rolling elements.

7. The planetary gear system of claim 1, wherein the pin further defines a central passage extending from the second end generally along the central planet axis and at least partially through the pin.

8. The planetary gear system of claim 1, wherein the first end is supported and the second end is unsupported.

9. The planetary gear system of claim 1, wherein the outer surface comprises a first portion extending from the first end and a second portion extending between the first portion and the second end, the second portion having a diameter larger than a diameter of the first portion, the outer surface further comprising an annular wall between the first portion and the second portion.

10. The planetary gear system of claim 9, wherein each of the plurality of bore holes extends from the wall generally along the central planet axis and at least partially through the pin.

11. The planetary gear system of claim 9, wherein the outer surface further comprises a third portion extending between the second portion and the second end and an annular wall between the second portion and the third portion.

12. A pin for coupling a planet gear to a carrier in a planetary gear system, the pin comprising:
a first end;
a second end;
an outer surface extending between the first end and the second end; and,
plurality of bore holes positioned in an annular array about the central planet axis, each of the plurality of bore holes defined in the pin extending from the outer surface generally along a central planet axis and at least partially through the pin.

13. The pin of claim 12, wherein the pin further defines a central passage extending from the second end generally along the central planet axis and at least partially through the pin.

14. The pin of claim 12, wherein the outer surface comprises a first portion extending from the first end and a second portion extending between the first portion and the second end, the second portion having a diameter larger than a diameter of the first portion, the outer surface further comprising an annular wall between the first portion and the second portion.

15. A planetary gear system comprising:
a planet gear defining a central planet axis;
a carrier disposed adjacent the at least one planet gear; and,
a pin extending from the carrier through the planet gear generally along the central planet axis, the pin comprising a first end, a second end, and an outer surface extending therebetween, the pin further defining an opening extending from the outer surface generally along the central planet axis and at least partially through the pin,
wherein the outer surface comprises a first portion extending from the first end, a second portion extending between the first portion and the second end, and a third portion extending between the second portion and the second end, the second portion having a diameter larger than a diameter of the first portion, the outer surface further comprising an annular wall between the first portion and the second portion and an annular wall between the second portion and the third portion.

16. The planetary gear system of claim 15, wherein the opening is a bore hole.

17. The planetary gear system of claim 16, further defining a plurality of bore holes positioned in an annular array about the central planet axis.

18. The planetary gear system of claim 15, wherein the opening is a generally annular opening.

19. The planetary gear system of claim 15, wherein the pin further defines a central passage extending from the second end generally along the central planet axis and at least partially through the pin.

20. The planetary gear system of claim 15, wherein the first end is supported and the second end is unsupported.

* * * * *